Figure 1:
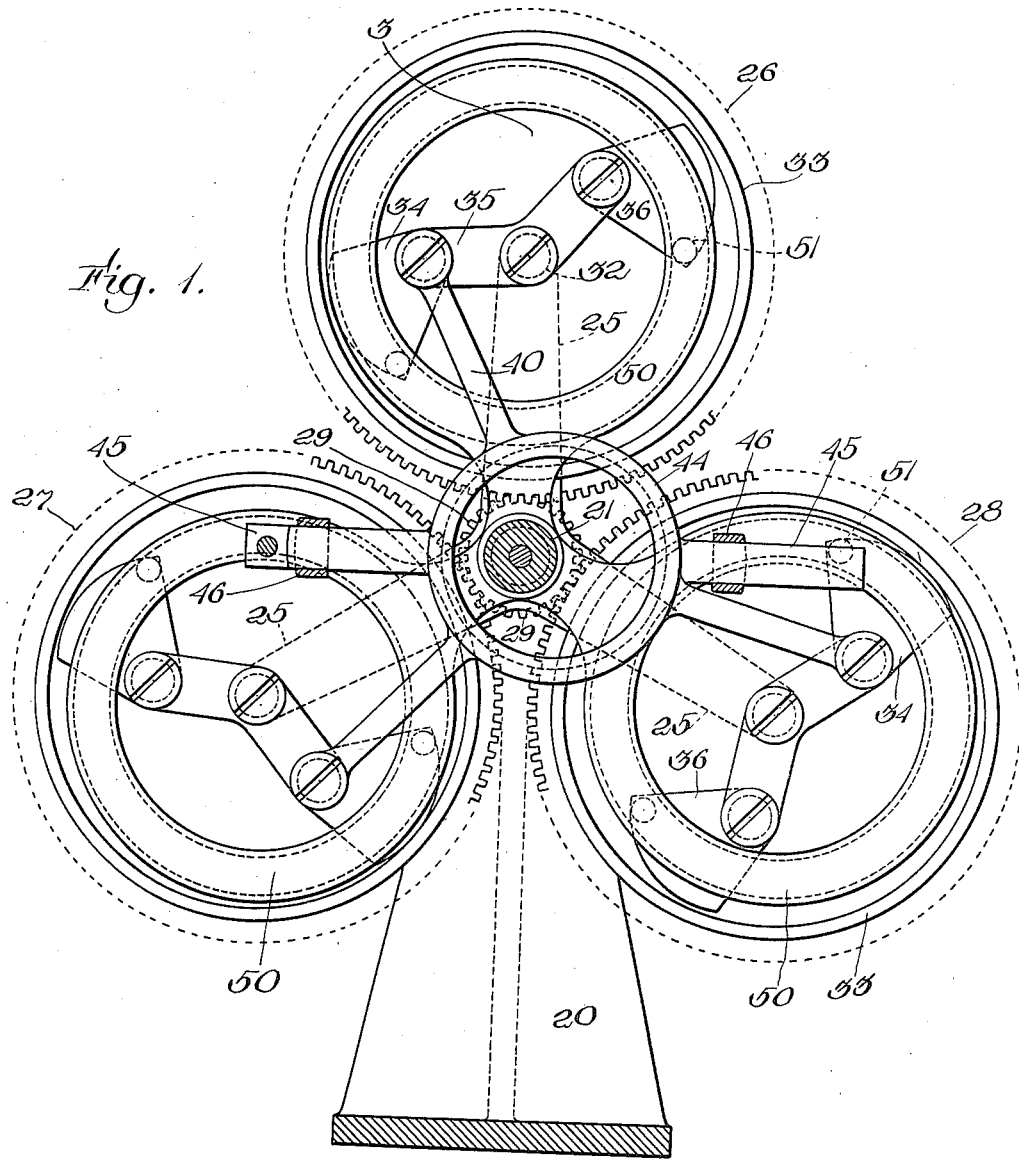

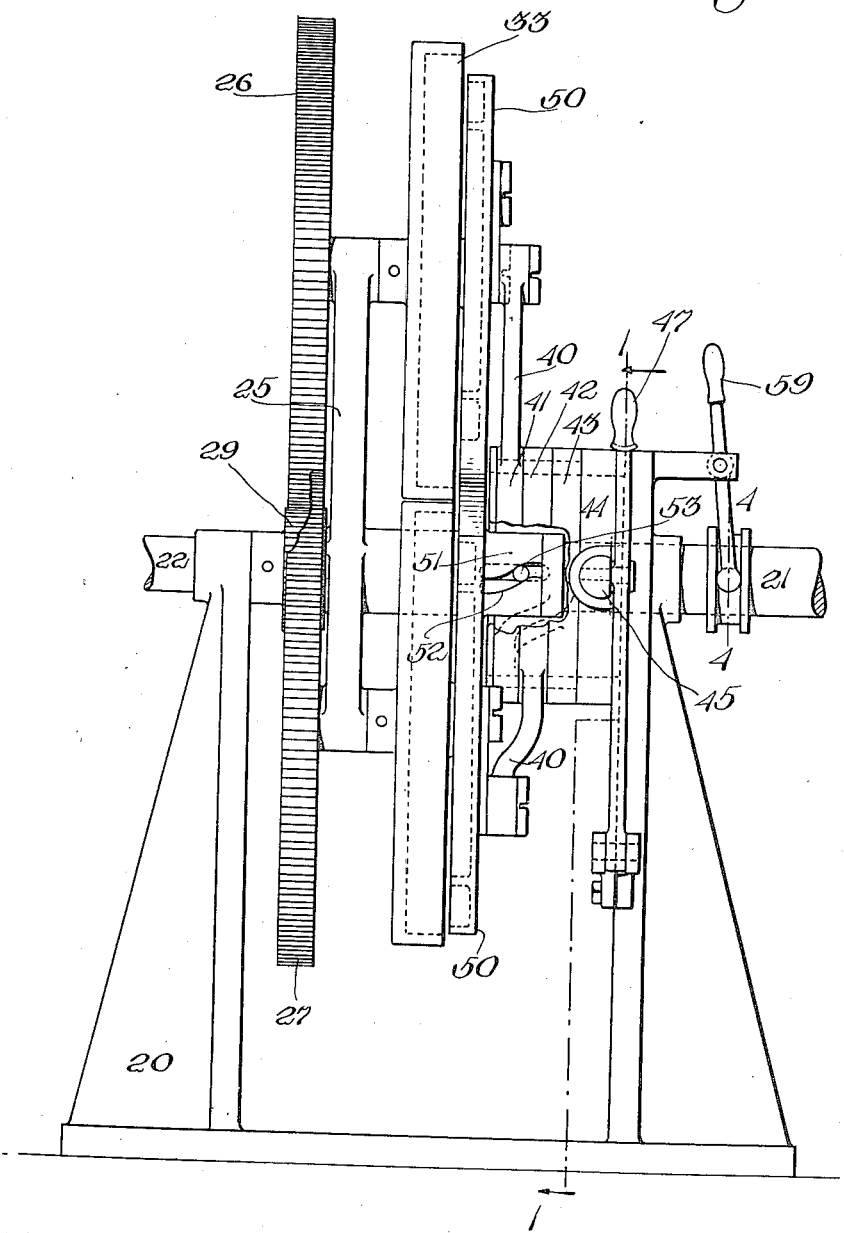

J. REECE.
VARIABLE SPEED TRANSMISSION.
APPLICATION FILED JAN. 20, 1914.
1,181,166.
Patented May 2, 1916.
3 SHEETS—SHEET 3.
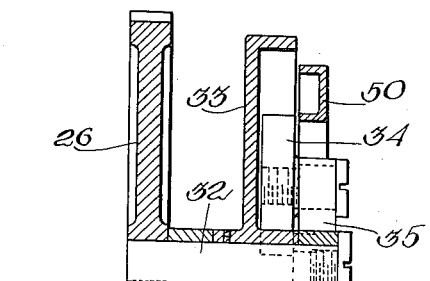
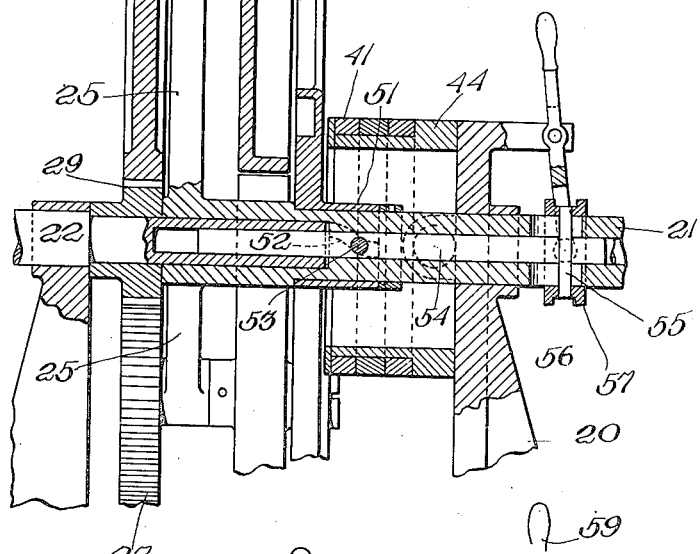
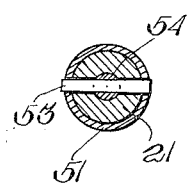
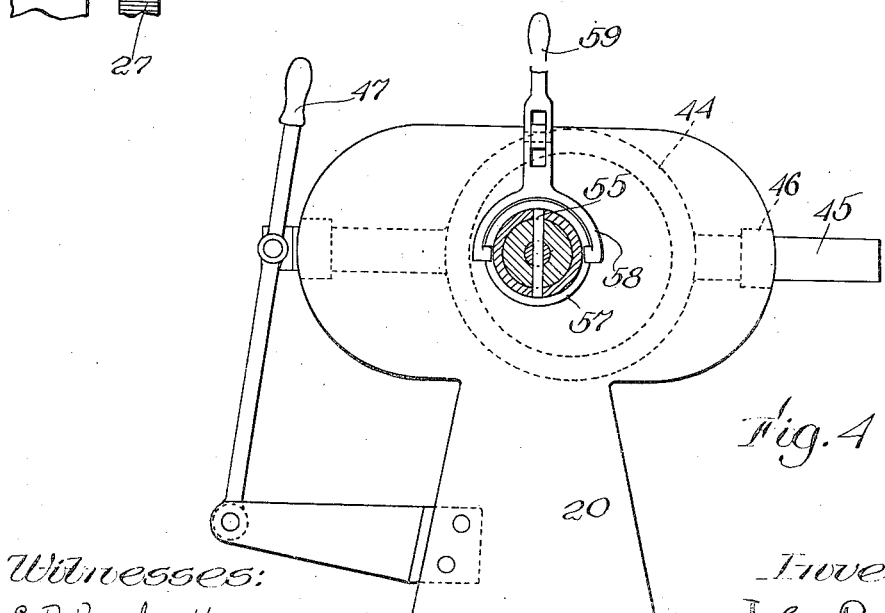
Witnesses:
E. P. Burnhardt
M. Sucker
Inventor:
John Reece,
by Rogers, Kennedy & Campbell
his Attorneys.

UNITED STATES PATENT OFFICE.

JOHN REECE, OF MANCHESTER, MASSACHUSETTS.

VARIABLE-SPEED TRANSMISSION.

1,181,166.        Specification of Letters Patent.        Patented May 2, 1916.

Application filed January 20, 1914. Serial No. 813,176.

*To all whom it may concern:*

Be it known that I, JOHN REECE, a citizen of the United States, residing at Manchester, in the county of Essex and State of Massachusetts, have invented certain new and useful Improvements in Variable-Speed Transmission, of which the following is a specification, reference being had therein to the accompanying drawing.

This invention relates to variable speed transmission, and more particularly to mechanism for transmitting rotary motion from a driving shaft to a driven shaft with adjustably variable speed ratio.

Generally the object hereof is to afford an improved and simplified variable speed transmission mechanism possessing efficiency of transmission, easily adjustable for varying the speed ratio, capable of giving any desired speed ratio between the higher and lower limits and free from the objections of heretofore known mechanisms.

To the attainment of such objects the present improvement consists in the novel combinations, mechanisms, devices, arrangements and details hereinafter referred to and illustrated in the accompanying drawings.

First will be described an illustrative mechanism in which the present improvement may be embodied, and thereafter the novel features will be set forth in the claims.

In the accompanying drawings forming a part hereof Figure 1 may be considered an end elevation, seen from the driving end and partly in section, of a variable speed transmission mechanism embodying the present improvements. Fig. 2 is a left-hand elevation of the parts seen in Fig. 1. Fig. 3 is a vertical central section of the same. Fig. 4 is an end view of such parts as are not seen in Fig. 1, partly in section on the plane 4—4 of Fig. 2. Fig. 5 is a detail section on the same plane.

The same reference numerals designate corresponding parts in the several figures.

The frame 20 may be of any form to afford bearings or journals for driving shaft 21 and driven shaft 22. It is an advantage of the present improvement that the two shafts may be placed in direct alinement, as shown. The two shafts mutually engage through annular portions and recesses, as is clear in Fig. 3 and will be explained more in detail hereinafter. Carried by and rotating with the driving shaft is a supporting member comprising three radial arms 25, 25, 25, at the extremities of which are mounted three large gear wheels 26, 27, 28. Meshing with all of the gear wheels 26, 27, 28, is a pinion 29 on the driven shaft 22. With such an arrangement, if the revolving gears are held from rotating on their own axes, the driving and driven shafts will rotate together as though rigidly united. So far, however, as the revolving gears are permitted or caused to rotate, the motion or speed of the driven shaft is modified.

According to this improvement, means are employed for rotating in unison with each other and in a definite manner the three large gears, so as to modify the driven shaft's relative speed. Each of the revolving gears is fast upon a central stud 32 journaled in a spider arm 25, and these rotatable studs, which may be termed gear shafts, are extended through and beyond their journals to where means is provided for effecting rotation for the purposes mentioned. For example, the rotation of each of the gear shafts 32 may be effected through a disk or drum 33 secured to and substantially forming a part of the gear shaft and intermittently engaged and actuated by a gripper 34. The gripper, instead of taking the form of a pawl engaging with teeth on the drum, may be a member substantially in the form shown carried on a gripper carrier 35 mounted to swing concentrically with the drum 33 and adapted by a sort of toggle action to forcibly grip the inner surface of the drum when the carrier is moved in driving direction. As with a pawl and ratchet, the gripper becomes inoperative upon a reverse movement of the carrier.

Referring to Fig. 1, the gripper carrier 35 is shown as an oscillating beam loosely mounted on the gear shaft 32 and extending beyond the shaft to where at its other end it is provided with a second gripper 36, shown out of action, but adapted to be thrown into action in lieu of the gripper 34 when the gears are to be reversely rotated. Hereinafter a means will be described for adjusting the drum and gripper mechanism between forward and reverse adjustments or to neutral adjustment wherein the gears have no rotation.

The gripper carrier 35 for the gear 26 is shown as connected by a rod 40 to an eccentric strap 41, and likewise, in connection with the gears 27 and 28, are connecting rods 40 extending to eccentric straps 42 and 43 respectively. All of these eccentric straps or rings 41, 42, 43, surround a stationary ring or eccentric 44 having collars at the ends to confine the rings. In the drawings the eccentric 44 is shown in its eccentric position, but it is adjustably movable for increasing or decreasing its eccentricity or for rendering it concentric with the driving shaft 21, when it is desired to cease reciprocating the grippers.

In the illustrated adjustment it is obvious that the revolving drum and gripper devices, coöperating with the stationary eccentric, cause the same relative to-and-fro movement as though the gear shafts were stationary in position and the eccentric revolved, so that the connecting rods 40 move relatively to-and-fro and cause the reciprocation of the gripper carriers 35 and the grippers 34 to intermittently impel the drums 33 and the gears in the desired direction.

For adjusting the eccentric 44, it is provided with a horizontal supporting extension 45 at each side sliding in fixed bearings 46 and coöperating with a speed controlling lever 47, by which the eccentric may be adjusted to any desired position and there secured.

So far there has been described adjustable mechanism whereby the driving shaft, rotating, for example, at a low speed, may cause the driven shaft to rotate at the same speed, or may, through adjustments, cause the desired rotation of the gears 26 to increase the driven shaft's speed, as may be desired, above that of the driving shaft. It should be stated that the described arrangement is such that the three grippers 34, 34, 34, operate in succession to impel their respective gears 26, 27, 28, so that the driven shaft is substantially continuously impelled thereby to have its additional speed beyond the driving shaft's speed.

To reverse the rotation and action of the gears 26, 27, 28, the grippers 34 are proposed to be thrown out and the grippers 36 thrown in operative relation to the drums 33. For this purpose each pair of grippers is provided with an adjusting member or ring 50 (see Figs. 1 and 3) grooved at its inner side to coöperate with pins 51 formed upon each of the grippers 34 and 36. The ring 50 is laterally adjustable, so that it may, by acting upon the pins 51, either permit the grippers to contact and impel the drums or, on the other hand, remove them from possibility of contact and driving co-action. Thus, the gripper 34 in each case is shown as in driving co-action with its drum, while the gripper 36 is shown as held inoperative. An adjustment of the ring 50 toward the right will reverse this condition and permit the gripper 36 to operate for reversely impelling the drum. The adjustment of all of the three rings 50 for this purpose may be effected as follows: All of the gripper adjusting rings 50 are rigidly connected together and to an axially located sleeve 51 surrounding a portion of the driving shaft. The sleeve and rings rotate together with the driving shaft, but are slightly circularly adjustable thereon, so as to permit the small relative adjustment between the ring position shown in Fig. 1 and an opposite position. To effect this circular adjustment the sleeve 51 has an inclined slot at 52, seen best in Fig. 2, engaged by a pin 53, which also engages a longitudinal slot formed in the wall of the hollow portion of the driving shaft. The pin 53 is fixed to an interior or axial reversing rod 54, which extends from the place where the slots are located to a convenient exterior point where means are provided for axially shifting the rod, so as to cause the longitudinal movement of the pin and thereby the circular adjustment of the sleeve 51 and the gripper rings 50. To axially move the rod 54, it is shown as having a lateral pin 55 extending through a pair of opposed longitudinal slots formed at 56 in the driving shaft, the ends of the pin engaging in an external sleeve 57, which rotates with the driving shaft, but is slidable longitudinally for shifting the rod. The sleeve 57 has a pair of collars forming a groove between them, which is engaged by the yoke end 58 of an adjusting handle 59.

By this construction, when the handle is thrown from the position illustrated in Figs. 2 and 3 toward the right, it shifts the rod 54 to the left, thereby moving the pin 53 and turning the sleeve 51, namely, with a right-hand revolution, viewing Fig. 1, so that the gripper adjusting rings are shifted across from one position to the other. By this mechanism it is possible to so adjust the parts that the motion of the driving shaft is communicated to the driven shaft at a reduced speed, the reduction depending in extent on the eccentricity of the stationary eccentric 44. Therefore, the driving speed may be communicated to the driven shaft without change or at an increased or decreased rate. The decreased speed of driven shaft will be effective, as the grippers are arranged, only if the driven shaft is doing very light work. By an excessive reverse drum and gripper action the driven shaft may be caused to rotate reversely.

The described mechanism includes besides the rotary driving and rotatable driven shafts, the support 25 revoluble with the driving shaft, one or more planet gears 26 rotatably mounted on the support, and the gear 29 on the driven shaft in mesh with the planet gears, together with means for predeterminedly rotating the planet gears to vary or modify the driven shaft speed. Said means is operated by the driving shaft's rotation and includes the intermittently acting reciprocating grippers 36. Each gripper coöperates with the drum 33, which, in effect is part of the gear 26, and is moved by the beam or gripper carrier 35, reciprocated by connecting rod 40. The rod is reciprocated by the eccentric, or axle or cam, or other member 44 which may be eccentrically positioned for that purpose, or adjusted toward and from concentric position to vary the gripper action between zero and maximum. Each gripper carrying beam extends across to the opposite side where it carries the reverse gripper, thrown in or out by the described gripper adjuster 50. All the described adjustments take place during operation and by the handles provided therefor.

It will thus be seen that there has been described a variable speed transmission accomplishing the recited objects and advantages, and other advantages will be apparent to those acquainted with the art. Since many matters of design, arrangement, detail and other features may be indefinitely varied without departing from the invention herein involved, no limitation to such features is intended excepting as specified in the appended claims.

What is claimed is:

1. Transmission mechanism including in combination a rotary driving shaft, a rotatable driven shaft, a support revoluble with the driving shaft, a planet gear rotatably mounted on said support, a gear on said driven shaft in mesh with said planet gear, and means including an intermittently acting reciprocating gripper operated by the driving shaft's rotation for rotating said planet gear at a variable relative speed to vary the driven shaft speed; said gripper adapted to coöperate with a part of the planet gear and provided with a gripper carrier, a connecting rod jointed to the carrier and a stationary member eccentrically positionable for reciprocating said rod.

2. Transmission mechanism including in combination a rotary driving shaft, a rotatable driven shaft, a support revoluble with the driving shaft, a planet gear rotatably mounted on said support, a gear on said driven shaft in mesh with said planet gear, and means including an intermittently acting reciprocating gripper operated by the driving shaft's rotation for rotating said planet gear at a variable relative speed to vary the driven shaft speed; said gripper adapted to coöperate with a part of the planet gear and provided with a gripper carrier, a connecting rod jointed to the carrier and a stationary member eccentrically positionable for reciprocating said rod, together with means to adjust said stationary member toward and from concentric position for varying the action of the gripper.

In testimony whereof I affix my signature in presence of two witnesses.

JOHN REECE.

Witnesses:
 E. P. BERNHARDT,
 WM. J. DOLAN.